(12) United States Patent
Gurindagunta

(10) Patent No.: US 11,595,605 B2
(45) Date of Patent: Feb. 28, 2023

(54) IMAGING SYSTEMS WITH IMPROVED CIRCUITRY TO PROVIDE BOOSTED CONTROL SIGNALS

(71) Applicant: SEMICONDUCTOR COMPONENTS INDUSTRIES, LLC, Phoenix, AZ (US)

(72) Inventor: Sundaraiah Gurindagunta, Vijayawada (IN)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 17/446,774

(22) Filed: Sep. 2, 2021

(65) Prior Publication Data

US 2021/0400215 A1    Dec. 23, 2021

Related U.S. Application Data

(62) Division of application No. 16/947,012, filed on Jul. 15, 2020, now Pat. No. 11,140,344.

(30) Foreign Application Priority Data

Aug. 21, 2019    (IN) .............................. 201911033632

(51) Int. Cl.
*H04N 5/369* (2011.01)
*H04N 5/378* (2011.01)
*H04N 5/376* (2011.01)

(52) U.S. Cl.
CPC .......... *H04N 5/3698* (2013.01); *H04N 5/376* (2013.01); *H04N 5/378* (2013.01)

(58) Field of Classification Search
CPC ...... H04N 5/3698; H04N 5/376; H04N 5/378; H04N 5/369
See application file for complete search history.

(56) References Cited

U.S. PATENT DOCUMENTS 8,106,703 B2    1/2012    Nagai et al.
8,848,078 B2    9/2014    Okano
(Continued)

OTHER PUBLICATIONS

B. Razavi, "Design of Analog CMOS Integrated Circuits", 2001, pp. 333-684, McGraw-Hill, New York.
(Continued)

*Primary Examiner* — Nelson D. Hernández Hernández
(74) *Attorney, Agent, or Firm* — Treyz Law Group, P.C.; David K. Cole

(57) ABSTRACT

An image sensor having rows and columns of image pixels may include row control circuitry that controls voltages that are sent to each row of the image pixels. The row control circuitry may include booster circuitry that converts a positive power supply voltage (such as 2.8V) to voltages that are negative or otherwise less than the positive power supply voltage and/or greater than the positive power supply voltage. The booster circuitry may have a plurality of switches that control an input to an amplifier, thereby allowing the circuitry to produce any desired voltage in a given range. The booster circuitry output may be shared between multiple rows of the image pixels, and the produced boosted circuitry may be fed to any desired one or more of the rows of image pixels.

20 Claims, 3 Drawing Sheets

(56) References Cited

U.S. PATENT DOCUMENTS

| | | | | |
|---|---|---|---|---|
| 2009/0051414 A1* | 2/2009 | Pahr | ............... | H02M 3/07 |
| | | | | 307/81 |
| 2009/0256940 A1* | 10/2009 | Pahr | ............... | H04N 5/3698 |
| | | | | 257/E21.616 |
| 2016/0286145 A1 | 9/2016 | Demonte et al. | | |
| 2019/0281243 A1 | 9/2019 | Gurindagunta et al. | | |

OTHER PUBLICATIONS

V.E. Shunkov, O.N. Kus, V.Y. Prokopyev, V.A. Butuzov, and Y.I. Bocharov, "Fully Integrated Switched-Capacitor Voltage Converter with Regulated Output," in Moscow Workshop on Electronic Networking Technologies (MWENT), 2018.

M.S. Makowski and D. Maksimovic, "Performance Limits of Switched-Capacitor DC-DC Converters," in Proceedings of PESC '95—Power Electronics Specialist Conference, 1995, pp. 1215-1221, vol. 2, Atlanta.

W. Kester, B. Erisman, and G. Thandi, "Switched Capacitor Voltage Converters," in Practical Design Techniques for Power and Thermal Management, 1998, Section 4.

A. Bindra, "Generating High DC Output Voltage from Low Input Supply," in Electronic Products, 2013, retrieved from the Internet <https://www.digikey.com/en/articles/generating-high-dc-output-voltage-from-low-input-supply>.

* cited by examiner

IMAGING SYSTEMS WITH IMPROVED CIRCUITRY TO PROVIDE BOOSTED CONTROL SIGNALS

This application is a division of U.S. patent application Ser. No. 16/947,012, filed Jul. 15, 2020, which claims the benefit of and claims priority to Indian patent application No. 201911033632, filed Aug. 21, 2019, which are hereby incorporated by reference herein in their entireties.

BACKGROUND

This relates generally to image sensors, and more specifically, to image sensors having boosted control signals.

Image sensors are commonly used in electronic devices such as cellular telephones, cameras, and computers to capture images. In a typical arrangement, an electronic device with an image sensor is provided with an array of image sensor pixels arranged in pixel rows and columns. Column sensing circuitry is typically coupled to each pixel column for reading out image signals from the image pixels. Row control circuitry is typically coupled to each pixel row for controlling operation of the image pixels. In some arrangements, boosted control signals may be used to provide control signals with desired voltages. However, conventional booster circuitry may lack the ability to provide a range of voltages that can be used with different types of image sensor pixels or may require too much area on the circuit substrate.

It would therefore be desirable to be able to provide imaging systems with improved circuitry to provide varying boosted control signals and reducing the required substrate area to implement the circuitry.

DETAILED DESCRIPTION

Embodiments of the present invention relate to image sensors, and more particularly to the booster circuitry within image sensors. It will be recognized by one skilled in the art that the present exemplary embodiments may be practiced without some or all of these specific details. In other instances, well-known operations have not been described in detail in order not to unnecessarily obscure the present embodiments.

Figure 1:
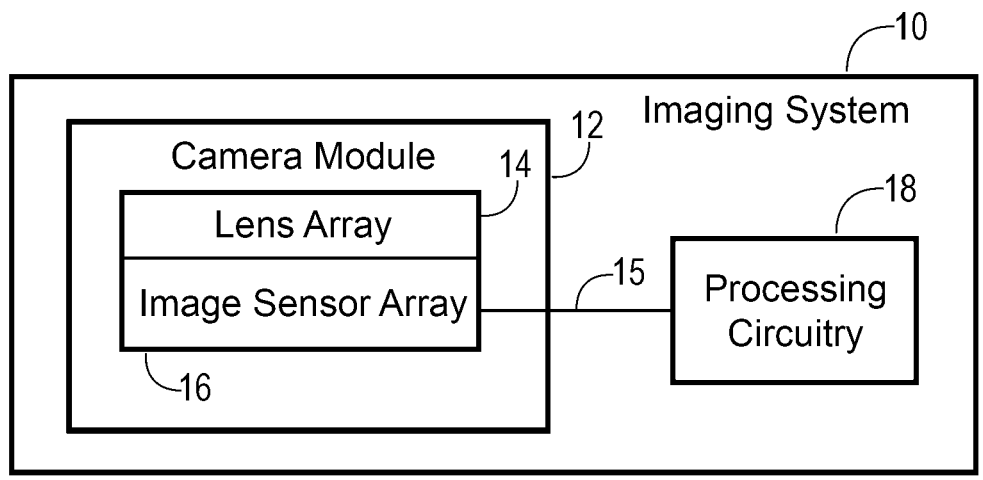
FIG. 1 is a diagram of an illustrative electronic device in accordance with an embodiment.

FIG. 1 is a diagram of an illustrative electronic device in accordance with an embodiment of the present invention. As shown in FIG. 1, imaging system 10 may be a portable imaging system such as a camera, automotive imaging system, cellular telephone, video camera, video surveillance system, or any other desired imaging device that captures digital image data. System 10 may include a camera module 12 that is used to convert incoming light into digital image data. Camera module 12 may include an array of lenses 14 and a corresponding image sensor array 16. Lens array 14 and image sensor array 16 may be mounted in a common package and may provide image data to processing circuitry 18. Image sensor array 16 may include one or more image sensors and lens array 14 may include one or more corresponding lenses.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensor array 16 or an integrated circuit within module 12 that is associated with image sensor array 16). Image data that has been captured and processed by camera module 12 may, if desired, be further processed and stored using processing circuitry 18. Processed image data may, if desired, be provided to external equipment (e.g., a computer or other device) using wired and/or wireless communications paths coupled to processing circuitry 18.

Image sensor array 16 may contain an array of individual image sensors configured to receive light of a given color by providing each image sensor with a color filter. The color filters that are used for image sensor pixel arrays in the image sensors may, for example, be red filters, blue filters, and green filters. Each filter may cover an image sensor pixel of a respective image sensor pixel array. Other filters such as white color filters, dual-band IR cutoff filters (e.g., filters that allow visible light and a range of infrared light), etc. may also be used.

Figure 2:
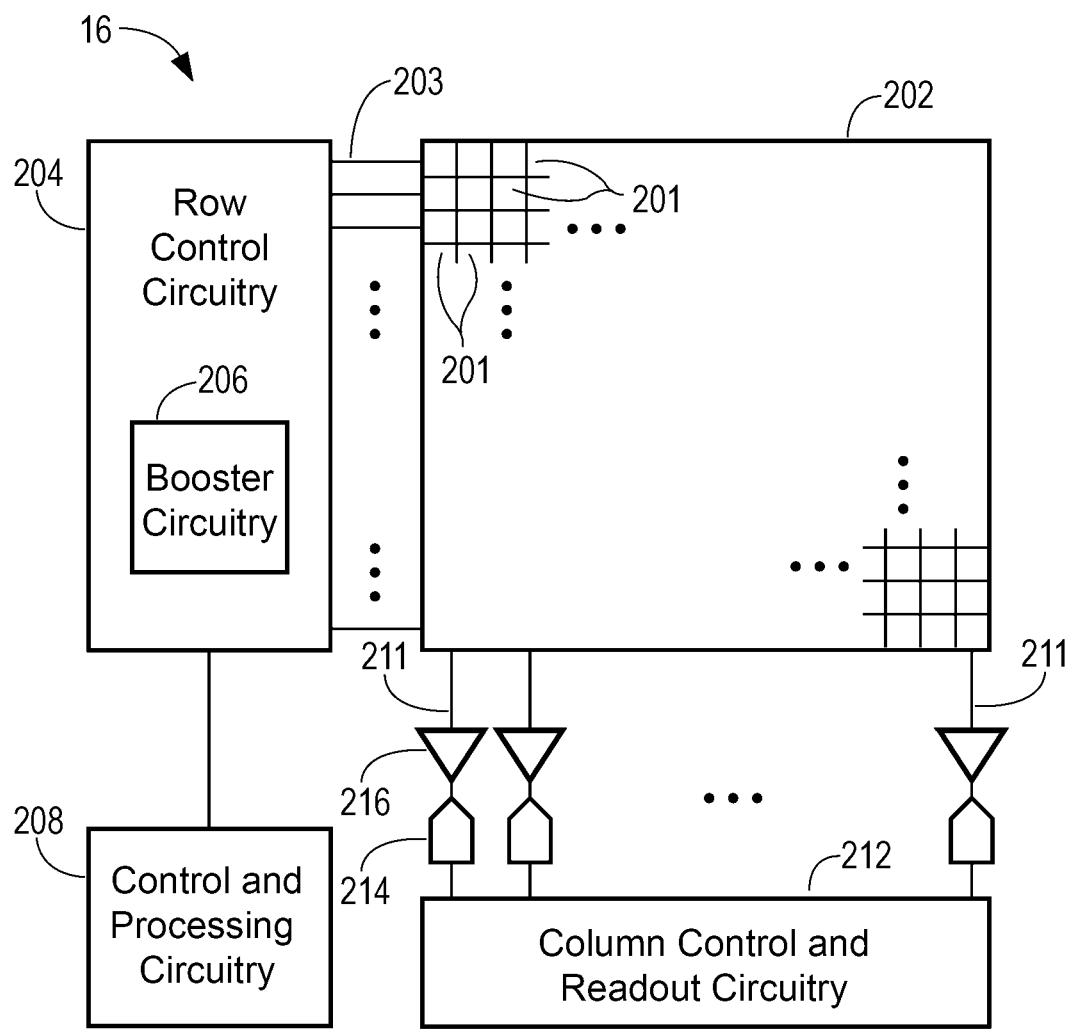
FIG. 2 is a diagram of an illustrative image pixel array in an image sensor that is controlled by row control circuitry having voltage booster control circuitry in accordance with an embodiment.

FIG. 2 is a diagram of an illustrative image pixel array (which may correspond to image sensor array 16 of FIG. 1) in an image sensor having row control circuitry with voltage boosting capabilities. The term "boost" and its derivatives may sometimes be used herein to indicate a voltage or a generation of a voltage which is lower than the ground reference or higher than the operating voltage supply. Boosting circuitry may be capable of producing a voltage that is higher than the operating voltage supply, as an example. In some examples, boosting circuitry may be capable of producing voltages within a range that includes voltages greater than the positive power supply voltage and lower than the ground power supply voltage (e.g., −1.0V to 4.0V or more). Row control circuitry with voltage boosting capabilities is shown in FIG. 2. As shown in FIG. 2, the image sensor (e.g., image sensor 16 of FIG. 1) may include pixel array 202 having multiple pixels 201 (sometimes referred to herein as image pixels 201, imaging pixels 201, or image sensor pixels 201) and row control circuitry 204 that is coupled to image pixel array 202. Row control circuitry 204 may provide pixel control signals (e.g., row select signals, pixel reset signals, charge transfer signals, etc.) to pixels 201 over corresponding row control lines 203 to control the capture and read out of images using image sensor pixels in array 202.

Row control circuitry 204 may include voltage booster circuitry 206 (sometimes referred to herein as voltage boosting circuitry 206, boosting circuitry 206, or booster circuitry 206) for providing pixel control signals generated at control circuitry 204 with a boosted voltage magnitude. Image sensor 16 may also include column control and readout circuitry 212 and control and processing circuitry 208 that is coupled to row control circuitry 204 and column circuitry 212. Column control circuitry 212 may be coupled to array 202 via multiple column lines 211 (e.g., each column of pixels 201 in array 202). A corresponding analog-to-digital converter (ADC) 214 and column amplifier 216 may be interposed on each column line 211 for amplifying analog signals captured by array 202 and converting the captured analog signals to corresponding digital pixel data. Column control and readout circuitry 212 may be coupled to external hardware such as processing circuitry. Column control and readout circuitry 212 may perform column readout based on signals received from control and processing circuitry 208. Column control and readout circuitry 212 may include column ADC circuits 214 and column amplifiers 216.

In practice, it may sometimes be desirable to provide pixel control signals to array 202 with a boosted voltage magnitude. If desired, booster circuitry 206 may provide signals (e.g., pixel control signals) generated at row control circuitry 204 with a desired voltage boost to generate corresponding boosted signals (e.g., boosted row control signals such as boosted charge transfer signals, boosted row select signals, boosted reset signals, etc.). For example, a system may have a supply voltage of 2.8V that can then be boosted to up to 4.0V or more in order to have a greater voltage magnitude than the supply voltage. The booster circuitry may also be capable of outputting control signals with a voltage magnitude less than the supply voltage. For example, for a supply voltage ($V_{AAPIX}$) of 2.8V, the booster circuitry may output control signals between −1.0V and 4.0V.

The signals from booster circuitry 206 (sometimes referred to herein as booster signals) may be provided to control circuitry for each row of image pixel array 202. It may sometimes be useful for signals generated by the control circuitry to have a greater magnitude than the supply voltage (e.g., because it increases the dynamic range of the pixel and may be necessary to provide light flicker mitigation). By increasing the dynamic range of the pixel, image quality can be increased in certain conditions such as when an image is captured in a low light environment. Other row signals, such as a charge transfer signal (that is provided to a transfer transistor) or gain select signal (that is provided to a gain select transistor coupled to a corresponding dual conversion gain capacitor), may be output by the booster circuitry at a voltage level less than ground and the power supply voltage (e.g., between −1.0V and 2.8V).

Amplifier 216 may be configured to receive analog signals (e.g., analog reset or image level signals) from pixel array 202 and to amplify the analog signals. The analog signals may include data from a single column of pixels or from multiple columns of pixels, depending on the application. ADC 214 may receive amplified analog signals from amplifier 216 and may perform analog-to-digital conversion operations on the analog signals before to generate digital data. The digital data may be transmitted to column control and readout circuitry 212 for processing and readout.

Figure 3:
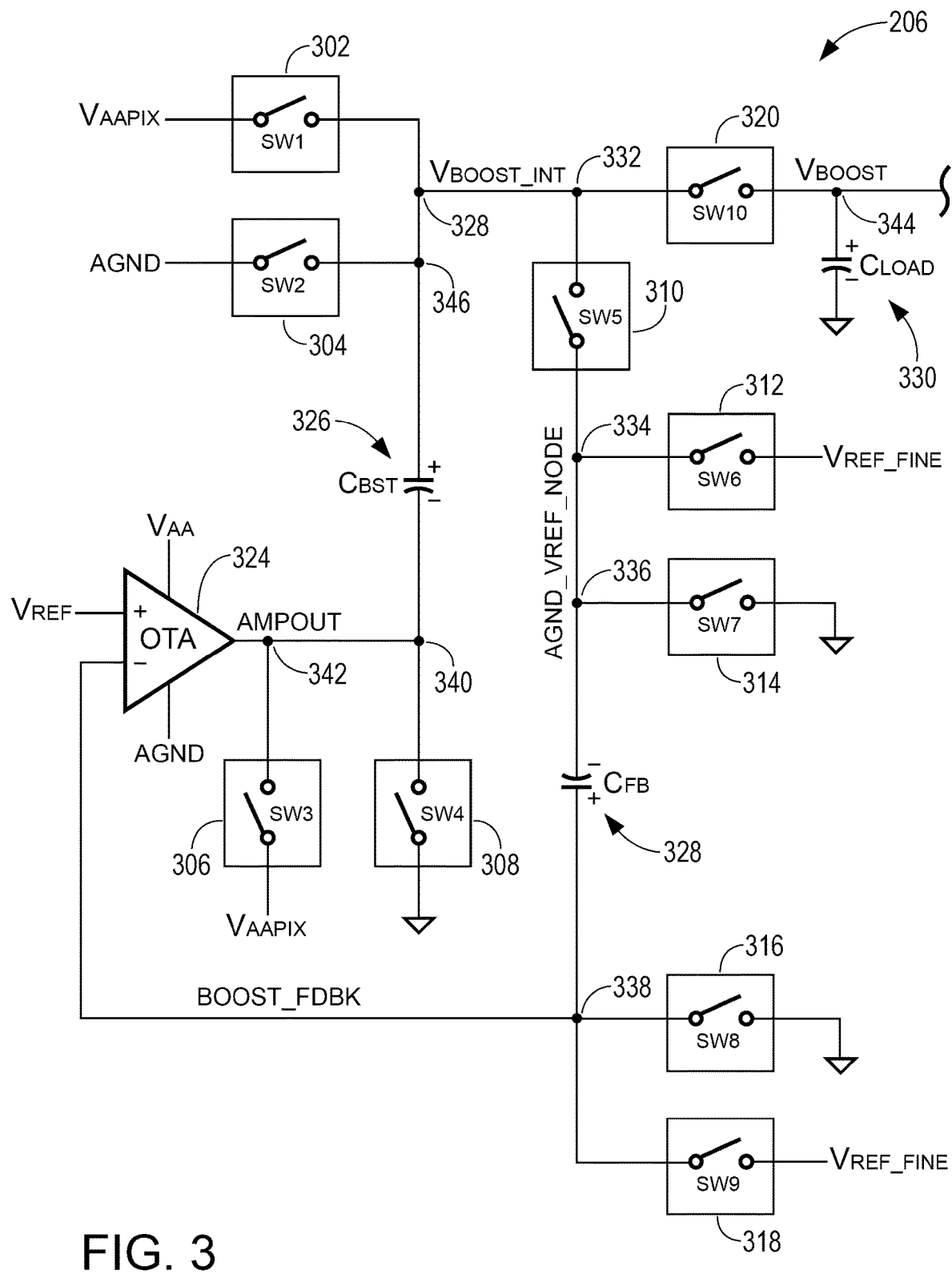
FIG. 3 is a circuit diagram of illustrative booster circuitry of the type shown in FIG. 2 in accordance with an embodiment.

Booster circuitry 206 that may be included in image sensor 16 is shown in FIG. 3. As shown in FIG. 3, booster circuitry 206 may include a first switch 302 (SW1) that may be coupled between a power supply voltage ($V_{AAPIX}$) and a node 328. Second switch 304 (SW2) may coupled between a ground (AGND) and node 346. Node 328 may be coupled to switch 320 (SW10) and to capacitor 326 ($C_{BST}$) through node 346. Switch 310 (SW5) may be coupled between switch 320 (through node 332) and capacitor 328 ($C_{FB}$) (through nodes 334 and 336). Switch 312 (SW6) may be coupled between a reference voltage ($V_{REF\_FINE}$) and node 334. Switch 314 (SW7) may be coupled between ground and node 336. Switch 320 may be coupled between node 332 and capacitor 330 ($C_{LOAD}$) through node 344, which may in turn be coupled to an output line of circuit 206 (e.g., that outputs $V_{BOOST}$). Switch 316 (SW8) may be coupled between ground and node 338. Switch 318 (SW9) may be coupled between a reference voltage ($V_{REF\_FINE}$) and node 338. Node 338 may be coupled to capacitor 328 and to an input of amplifier 324 (e.g., an operational transconductance amplifier). Amplifier 324 (OTA) may have first and second inputs. The first input of amplifier 324 may be coupled to a reference voltage ($V_{REF}$) whereas the second input of amplifier 324 may be coupled to node 338 (BOOST_FDBK). Additionally, a positive power supply ($V_{AA}$) and a ground power supply (AGND) may be coupled to amplifier 324. The output of amplifier 324 (AMPOUT) may be coupled to node 340 that is coupled between capacitor 326 and switch 308 through node 342. Switch 308 (SW4) may be coupled between node 340 and ground, and switch 306 (SW3) may be coupled between a power supply voltage ($V_{AAPIX}$) and node 342.

Each switch may be optionally opened (e.g., turned off, thereby disconnecting the components between which the switch is positioned) or closed (e.g., turned on, thereby connecting the components between which the switch is positioned). Although not explicitly labeled in FIG. 3, each switch may have respective first and second terminals that are optionally connected or disconnected.

During operation, booster circuitry 206 may be used to provide a desired output voltage ($V_{BOOST}$). The output voltage $V_{BOOST}$ may be provided to a switching array that provides control signals to imaging pixels in the image sensor, as an example. It may be desirable for booster circuitry to be able to output a voltage that is controllable within a range between −1.0V (e.g., a voltage less than the ground voltage) and 4.0V (e.g., a voltage greater than the power supply voltage). Booster circuitry 206 may have four modes of operation to enable output of a voltage between −1.0V and 4.0V. In the first mode of operation, switch 304 (SW2), switch 306 (SW3), switch 314 (SW7), and switch 318 (SW9) may be turned on during pre-charge operations, and the boosted voltage may be between −1.0V and 0V. In the second mode of operation, switch 304 (SW2), switch 308 (SW4), switch 314 (SW7), and switch 316 (SW8) may be on during pre-charge operations, and the boosted voltage may be between 0V and 2.0V. In the third mode of operation, switch 304 (SW2), switch 308 (SW4), switch 312 (SW6), and switch 316 (SW8) may be on during pre-charge operations, and the boosted voltage may be greater than 2.0V. In the fourth mode of operation, switch 302 (SW1), switch 308 (SW4), one of switches 310 (SW5) and 312 (SW6), and switch 316 (SW8) may be on during pre-charge operations, and the boosted voltage may be greater than 2.8V. In this way, any desired voltage may be output from booster circuit 206 to be fed to rows of pixels within array 202.

First, the operation of the booster circuitry in the first mode of operation will be described. In the first mode of operation, a pre-charge phase may first be completed. During the pre-charge phase, switch 304 (SW2), switch 306 (SW3), switch 314 (SW7), and switch 318 (SW9) may be connected and switch 302 (SW1), switch 308 (SW4), switch 310 (SW5), switch 312 (SW6), switch 316 (SW8), and switch 320 (SW10) may be disconnected. Because switch 304 (SW2) is on, ground voltage AGND may be provided to capacitor 326. Switch 306 (SW3) may couple capacitor 326 to power supply voltage ($V_{AAPIX}$), so during the pre-charge phase, capacitor 326 is coupled between $V_{AAPIX}$ and ground. Because switch 318 is on, reference voltage ($V_{REF\_FINE}$)

may be provided to capacitor 328. Switch 314 (SW7) may couple capacitor 328 to ground, so during the pre-charge phase, capacitor 324 is coupled between $V_{REF\_FINE}$ and ground. In this way, $V_{BOOST\_INT}$ at node 328 may be at ground, AMPOUT at node 340 may be $V_{AAPIX}$, AGND_VREF_NODE at node 336 may be at ground, and BOOST_FDBK at node 338 may be $V_{REF\_FINE}$.

During the pre-charge phase, amplifier 324 (OTA) may be off in a single shot boosting operation, or may be in a boosting phase for another switched capacitor circuit if used in a multi-shot boosting operation.

After the pre-charge phase is complete, the boost phase may occur. During the boost phase, switch 304 (SW2), switch 306 (SW3), switch 314 (SW7), and switch 318 (SW9) may be disconnected, and switch 310 (SW5) and switch 320 (SW10) may be connected. Amplifier 324 (OTA) may be enabled, and a reference voltage ($V_{REF}$) may be provided to the first input of amplifier 324. The voltage ($V_{BOOST\_INT}$) at node 328 will equal the first input voltage $V_{REF}$ minus the second input voltage (e.g., BOOST_FDBK) $V_{REF\_FINE}$. Because switch 320 is closed, $V_{BOOST}$ (the output voltage) will equal $V_{BOOST\_INT}$. Therefore, $V_{BOOST}=V_{REF}-V_{REF\_FINE}$ and $V_{BOOST\_INT}$ may be controlled between −1.0V and 0V such that the output voltage $V_{BOOST}$ has a desired value between −1.0V and 0V (if $V_{REF}$ is less than $V_{REF\_FINE}$). In particular, $V_{REF}$ may be changed to change the output voltage as desired. The output (AMPOUT) of amplifier 324 may be changed to a value to support the $V_{BOOST\_INT}$ voltage change.

Next, consider operation of the booster circuitry in the second mode of operation. In the second mode of operation, a pre-charge phase may first be completed. During the pre-charge phase, switch 304 (SW2), switch 308 (SW4), switch 314 (SW7), and switch 316 (SW8) may be turned on. Switches 302, 306, 310, 312, 318, and 320 may be turned off. Because switch 304 (SW2) is turned on, the ground voltage (AGND) may be provided to capacitor 326. Switch 308 (SW4) also may couple capacitor 326 to ground. Switch 314 (SW7) and switch 316 (SW8) may similarly couple both plates of capacitor 328 (and BOOST_FDBK) to ground. In this way, $V_{BOOST\_INT}$ at node 328, AMPOUT at node 340, AGND_VREF_NODE, and BOOST_FDBK and node 338 may all be at ground.

During the pre-charge phase, amplifier 324 (OTA) may be off in a single shot boosting operation, or may be in a boosting phase for another switched capacitor circuit if used in a multi-shot boosting operation.

Next, the boost phase may occur. During the boost phase, switch 304 (SW2), switch 308 (SW4), switch 314 (SW7), and switch 316 (SW8) may be opened, while switches 310 (SW5) and 320 (SW10) may be closed. Amplifier 324 (OTA) may be enabled, and a reference voltage ($V_{REF}$) may be provided to the first input of amplifier 324. This causes the voltage ($V_{BOOST\_INT}$) at node 328 to become equal to reference voltage $V_{REF}$. Because switch 320 is closed, $V_{BOOST}$ (the output voltage of booster circuit 206) will equal $V_{BOOST\_INT}$. Therefore, $V_{BOOST}=V_{REF}$ and $V_{BOOST\_INT}$ may be controlled between 0V and 2.0V such that the output voltage $V_{BOOST}$ has a desired value between 0V and 2.0V (depending on the reference voltage $V_{REF}$). The output (AMPOUT) of amplifier 324 may be changed to a value to support the $V_{BOOST\_INT}$ voltage change.

Next, consider operation of the booster circuitry in the third mode of operation. In the third mode of operation, a pre-charge phase may first be completed. During the pre-charge phase, switch 304 (SW2), switch 308 (SW4), switch 312 (SW6), and switch 316 (SW8) may be turned on. Switches 302, 306, 310, 314, 318, and 320 may be turned off. Because switch 304 (SW2) is turned on, the ground voltage (AGND) is provided to capacitor 326. Switch 308 (SW4) also couples capacitor 326 to ground. Switch 312 (SW6) couples capacitor 328 to reference voltage ($V_{REF\_FINE}$), and switch 316 (SW8) couples capacitor 328 to ground. In this way, $V_{BOOST\_INT}$ at node 328, AMPOUT at node 340, and BOOST_FDBK and node 338 may all be at ground, and AGND_VREF_NODE may be at $V_{REF\_FINE}$.

During the pre-charge phase, amplifier 324 (OTA) may be off in a single shot boosting operation, or may be in a boosting phase for another switched capacitor circuit if used in a multi-shot boosting operation.

Next, the boost phase may occur. During the boost phase, switch 304 (SW2), switch 308 (SW4), switch 312 (SW6), and switch 316 (SW8) may be opened, while switches 310 (SW5) and 320 (SW10) may be closed. Amplifier 324 (OTA) may be enabled, and a reference voltage ($V_{REF}$) may be provided to the first input of amplifier 324. This causes the voltage ($V_{BOOST\_INT}$) at node 328 to become equal to reference voltage $V_{REF}$. Because switch 320 is closed, $V_{BOOST}$ (the output voltage) will equal $V_{BOOST\_INT}$+AGND_VREF_NODE. Therefore, $V_{BOOST}=V_{REF}+V_{REF\_FINE}$ and $V_{BOOST\_INT}$ can be controlled from 2.0V to desired voltages above 2.0V such that the output voltage $V_{BOOST}$ has a desired value from 2.0V (depending on the reference voltage $V_{REF}$, assuming that $V_{REF\_FINE}$ is 2.0V, although $V_{REF\_FINE}$ may have any desired value). The output (AMPOUT) of amplifier 324 may be changed to a value to support the $V_{BOOST\_INT}$ voltage change.

Finally, consider operation of the booster circuitry in the fourth mode of operation. In the fourth mode of operation, a pre-charge phase may first be completed. During the pre-charge phase, switch 302 (SW1), switch 308 (SW4), one of switches 310 (SW5) and 312 (SW6), and switch 316 (SW8) may be turned on. Switches 304, 306, 314, 318, and 320, along with one of switches 310 and 312 (e.g., SW5 may be off if SW6 is on and vice versa) may be turned off. Because switch 302 (SW1) is turned on, the power supply voltage ($V_{AAPIX}$) is provided to capacitor 326. Switch 308 (SW4) couples capacitor 326 to ground, so capacitor 326 is coupled between $V_{AAPIX}$ and ground. If switch 310 (SW5) is turned on (meaning switch 312 is off), capacitor 328 may be coupled to $V_{AAPIX}$. Alternatively, if switch 312 (SW6) is turned on (meaning switch 310 is off), capacitor 328 may instead be coupled to $V_{REF\_FINE}$. Switch 316 (SW8) couples capacitor 328 to ground, so capacitor 328 may be coupled between $V_{AAPIX}$ and ground (if SW5 is enabled) or between $V_{REF\_FINE}$ and ground (if SW6 is enabled). In this way, $V_{BOOST\_INT}$ at node 328, AMPOUT at node 340, and BOOST_FDBK and node 338 may all be at ground, and AGND_VREF_NODE may be at $V_{AAPIX}$ (if switch 310 is enabled) or at $V_{REF\_FINE}$ (if switch 312 is enabled).

During the pre-charge phase, amplifier 324 (OTA) may be off in a single shot boosting operation, or may be in a boosting phase for another switched capacitor circuit if used in a multi-shot boosting operation.

Next, the boost phase may occur. During the boost phase, switch 302 (SW1), switch 308 (SW4), one of switches 310 (SW5) and 312 (SW6), and switch 316 (SW8) may be opened, and switches 310 (SW5) and 320 (SW10) may be closed. Amplifier 324 (OTA) may be enabled, and a reference voltage ($V_{REF}$) may be provided to the first input of amplifier 324. This causes the voltage ($V_{BOOST\_INT}$) at node 328 of to become equal to reference voltage $V_{REF}$. Because switch 320 is closed, $V_{BOOST}$ (the output voltage) will equal $V_{BOOST\_INT}$+AGND_VREF_NODE. Therefore, $V_{BOOST}=V_{REF}+V_{AAPIX}$ (if switch 310 was enabled during the pre-charge phase) and $V_{BOOST\_INT}$ can be controlled from 2.8V to desired voltages above 2.8V such that the output voltage $V_{BOOST}$ has a desired value from 2.8V (depending upon the reference voltage $V_{REF}$, assuming that $V_{AAPIX}$ is 2.8V). For example, $V_{BOOST}$ may be adjustable between 2.8V and 4.8V. Alternatively, $V_{BOOST}=V_{REF}+V_{REF\_FINE}$ (if switch 312 was enabled during the pre-charge phase) and $V_{BOOST\_INT}$ can be controlled from 2.0V and above 2.0V such that the output voltage $V_{BOOST}$ has a desired value from 2.0V (depending on the reference voltage $V_{REF}$, assuming that $V_{REF\_FINE}$ is 2.0V). For example, $V_{BOOST}$ may be adjustable between 2.0V and 4.0V. The output (AMPOUT) of amplifier 324 may be changed to a value to support the $V_{BOOST\_INT}$ voltage change.

To summarize, the booster circuitry of FIG. 3 may support an output voltage range between −1.0V and 4.0V (or higher) with a single circuit. The first mode may support an output voltage range between −1.0V and 0V, the second mode may support an output voltage range between 0V and 2.0V, the third mode may support an output voltage range between 2.0V and 4.0V, and the fourth mode may support an output voltage range between 2.0V and 4.0V, or between 2.8V and 4.8V, if desired. This range of boosted voltages may be used in conjunction with image sensors operated in light flicker mitigation or overflow modes, as the booster circuits may be dynamically configured to provide the output required during read, shutter, light flicker mitigation, and partial pulsing operations of these modes. Specifically, the circuitry of FIG. 3 may support an output voltage between −1.0V and 4.0V when $V_{AAPIX}$ and $V_{AA}$ are 2.8V, $V_{REF}$ is between 0V and 2V, and $V_{REF\_FINE}$ is 2V. In general, however, these voltages may be varied as desired to achieve desired $V_{BOOST}$ output voltages.

In any of the operating modes, boost voltage $V_{BOOST}$ may be output to each row of pixels within array 202. In particular, each row of pixels may be connected to the output line of booster circuitry 206 through a respective switch, enabling $V_{BOOST}$ to be fed to one or more rows of the pixels. In this way, varying voltages (depending on the mode in which booster circuitry is operated and when the respective switches for each row of pixels are activated/deactivated) may be fed to any desired row(s) of the pixels.

The switches shown in FIG. 3 may have any desired structure. For example, a switch that physically connects or disconnects two terminals may be used (e.g., a single-pole single-throw switch). Alternatively, a transistor formed in a semiconductor may be used to switch on or off the flow of signals in the circuit. These examples are merely illustrative, and each switch in the circuit may have any desired respective structure.

Because booster circuitry has switches SW1-SW10 and can vary $V_{BOOST}$ within the desired voltage range, booster circuitry 206 may be simplified to a single circuit that may share the output voltage with each row of array 202 (as opposed to traditional solutions that required individual booster circuits for each pixel row). In particular, each row may have a single switch, two switches, or three switches to select when to receive voltage from booster circuitry 206, rather than individual switches SW1-SW10. This may reduce the substrate area needed to implement booster circuitry 206.

Figure 4:
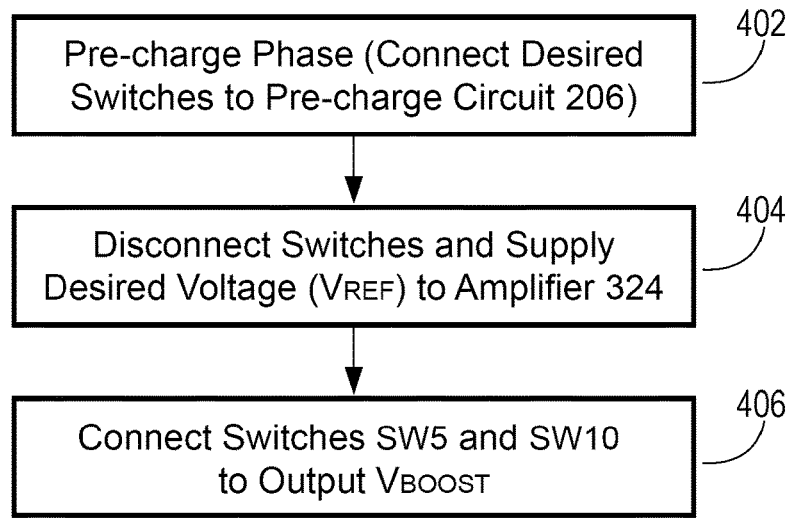
FIG. 4 is a diagram of illustrative method steps for operating booster circuitry of the type shown in FIG. 3 in accordance with an embodiment.

FIG. 4 is a diagram of illustrative method steps for operating booster circuitry 204. At step 402, switches may be enabled to pre-charge circuit 206 to a desired voltage. For example, in the first mode, switches SW2, SW3, SW7, and SW9 are connected during the pre-charge phase. This sets AMPOUT to $V_{AAPIX}$ due to switch SW3 being on and BOOST_FDBK to $V_{REF\_FINE}$ due to switch SW9 being on. For the second, third, and fourth modes, different switches may be connected, as described above in connection with FIG. 3. At step 404, the switches may be disconnected, and a desired reference voltage ($V_{REF}$) may be provided to the input of amplifier 324. $V_{REF}$ may be between 0V and 2.0V, for example. At step 406, switches SW5 and SW10 may be connected to output $V_{BOOST}$ from circuit 206.

It should be noted that the order of steps shown in FIG. 4 are merely illustrative. If desired, the order of certain steps (e.g., supplying $V_{REF}$ to amplifier 324 and enabling switches SW5 and SW10) may be switched or performed at different points in the method.

Figure 5:
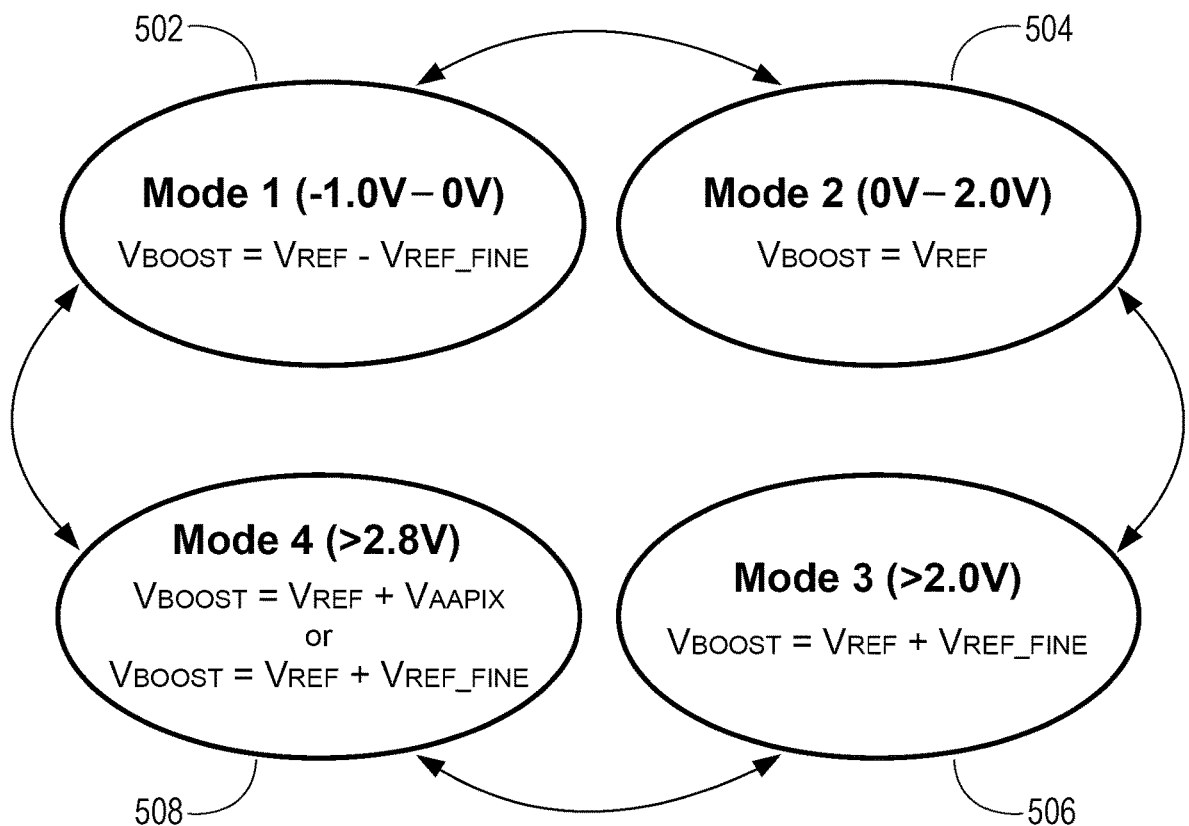
FIG. 5 is a state diagram showing illustrative operating modes for booster circuitry of the type shown in FIG. 3 in accordance with an embodiment.

A state diagram showing illustrative operating modes for booster circuitry 206 is shown in FIG. 5. When operating in the first operating mode 502, booster circuitry may output a voltage between −1.0V and 0V. When operating in the second operating mode 504, booster circuitry may output a voltage between 0V and 2.0V. When operating in the third operating mode 506, booster circuitry may output a voltage between 2.0V and 4.0V. When operating in the fourth operating mode 508, booster circuitry may output a voltage between 2.8V and 4.8V. In general, in each of the operating modes, the reference voltage $V_{REF}$ may be adjusted to provide for a desired output voltage from circuit 206. This may allow booster circuit 206 to be compatible with image sensor pixels and arrays that require different ranges of voltages for control signals, and may be used to control light flicker mitigation components, overflow charge components, and charge transfer components, as examples. Moreover, by providing voltages from −1.0V to 0V, booster circuit 206 may allow corresponding pixels to have faster settling times. The use of a booster circuit 206 may also allow for fewer control lines to be connected to each individual pixel in an image sensor, as the booster circuit may provide a desired range of voltages to the pixels.

It should be noted that the examples for voltages included herein (e.g., $V_{AAPIX}$ being 2.8V, $V_{REF}$ being 2.0V, etc.) are merely illustrative. In general, each reference voltage and supply voltage described herein may be any desired voltage.

Moreover, although specific modes of operation have been described, these are merely illustrative. In general, booster circuit 206 can be operated in any desired mode of operation to produce any desired boosted voltage. In general, the boosted voltage may be shown in equation (1):

$$V_{BOOST} = \text{AGND\_VREF\_NODE} + (V_{REF} - \text{BOOST\_FDBK}) \quad (1)$$

where ANGD_VREF_NODE, $V_{REF}$, and BOOST_FDBK are the voltages described above in connection with FIG. 2. In general, switches SW1 through SW10 may be adjusted (e.g., connected and disconnected) during the pre-charge phase in any desired manner to set AGND_VREF_NODE and BOOST_FDBK to desired voltage levels, and $V_{REF}$ (e.g., the input to amplifier 324) may be adjusted to result in a desired output voltage $V_{BOOST}$.

In various embodiments, an image sensor may include an array of imaging pixels having rows and columns of pixels, and row control circuitry coupled to the rows of pixels. The row control circuitry may include booster circuitry that has a first plurality of switches coupled to ground and power supply sources, an amplifier with first and second inputs and an output, wherein the first input is coupled to a first reference voltage, a second plurality of switches coupled to the output of the amplifier, a first capacitor coupled between the first plurality of switches and the second plurality of switches, a second capacitor. a third plurality of switches coupled between the first plurality of switches and the second capacitor, a fourth plurality of switches coupled between the second capacitor and the second input of the amplifier, and an output switch, wherein a node is interposed between the first plurality of switches and the output switch and wherein the third plurality of switches is coupled to the node.

In some embodiments, the first plurality of switches may include a first switch coupled to a first additional node that is between the output of the amplifier and the output switch, wherein the first switch is coupled to the power supply voltage, and a second switch coupled to a second additional node, wherein the first additional node is between the second additional node and the output switch, and wherein the second switch is coupled to ground.

In some embodiments, the second plurality of switches may include a third switch coupled between the first capacitor and the power supply voltage, wherein the third switch is coupled to the power supply voltage, and a fourth switch coupled to a third additional node between the first capacitor and the output of the amplifier, wherein the fourth switch is coupled to ground.

In some embodiments, the third plurality of switches may include a fifth switch coupled to a fourth additional node that is between the first node and the output switch, wherein the second capacitor is coupled between the fifth switch and the second input of the amplifier, a sixth switch coupled to a fifth additional node between the fifth switch and the second capacitor, wherein the sixth switch is coupled to a second reference voltage, and a seventh switch coupled to a sixth additional node between the fifth node and the second capacitor, wherein the seventh switch is coupled to ground.

In some embodiments, the fourth plurality of switches may include eight and ninth switches coupled in parallel to a second node between the second capacitor and the second input of the amplifier, wherein the eight switch is coupled to ground and wherein the ninth switch is coupled to the second reference voltage.

In some embodiments, the output switch may be coupled to an output node, and the booster circuitry may further include a third capacitor coupled to the output node.

In some embodiments, the power supply voltage may be 2.8V.

In some embodiments, the second switch, the third switch, the seventh switch, and the ninth switch are configured to be on during pre-charge operations to output a voltage between −1.0V and 0V from the booster circuitry.

In some embodiments, the second switch, the fourth switch, the seventh switch, and the eighth switch are configured to be on during pre-charge operations to output a voltage between 0V and 2.0V from the booster circuitry.

In some embodiments, the second switch, the fourth switch, the sixth switch, and the eighth switch are configured to be on during pre-charge operations to output a voltage above 2.0V from the booster circuitry.

In some embodiments, the first switch, the fourth switch, the eighth switch, and at least one of the fifth switch and the sixth switch are configured to be on during pre-charge operations to output a voltage above 2.8V from the booster circuitry.

In various embodiments, a method of operating an image sensor having an array of pixels arranged in rows and columns, and row control circuitry that includes booster circuitry that is shared between multiple rows of the pixels may include pre-charging the booster circuitry by turning on desired switches within the circuitry and connecting a first input of an amplifier within the circuitry to a power supply voltage, disconnecting the switches and supplying a reference voltage to a second input of the amplifier to output a boosted output voltage from the amplifier, and directing the boosted output voltage to one or more of the rows of pixels using switches that correspond to the respective one or more of the rows of pixels.

In some embodiments, connecting the first input of an amplifier within the circuitry to the power supply voltage comprises connecting the first input of the amplifier within the circuitry to a positive power voltage and wherein disconnecting the switches and supplying the reference voltage to the second input of the amplifier to output the boosted output voltage from the amplifier comprising outputting a negative boosted output voltage.

In some embodiments, connecting the first input of the amplifier within the circuitry to the power supply voltage comprises connecting the first input of the amplifier within the circuitry to 2.8V and disconnecting the switches and supplying the reference voltage to the second input of the amplifier to output the boosted output voltage from the amplifier comprises outputting a voltage greater than 2.8V.

In various embodiments, an image sensor may include an array of imaging pixels having rows and columns of pixels, and row control circuitry coupled to the rows of pixels. The row control circuitry may include booster circuitry that is shared between multiple rows of pixels, the booster circuitry may include an amplifier and a plurality of switches that are configured to produce an output voltage from a power supply voltage, and the switches may be configured to be placed in a first mode during pre-charge operations to output a first voltage with the booster circuitry, to be placed in a second mode during pre-charge operations to output a second voltage that is different from the first voltage, to be placed in a third mode during pre-charge operations to output a third voltage that is different from the first and second voltages, and to be places in a fourth mode during pre-charge operations to output a fourth voltage that is different from the first, second, and third voltages.

In some embodiments, the power supply voltage is 2.8V.

In some embodiments, the first voltage is between −1.0V and 0V.

In some embodiments, the second voltage is 0V to 2.0V, the third voltage is greater than 2.0V, and the fourth voltage is greater than 2.8V.

In some embodiments, the power supply voltage is a positive voltage, the first voltage is a negative voltage, and the fourth voltage is greater than the power supply voltage.

In some embodiments, each row of pixels has a switch coupled to the booster circuitry, and the output voltage may be configured to be fed to a respective row of pixels by turning on the switch coupled to the booster circuitry.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor comprising:
   an array of imaging pixels having rows and columns of pixels; and
   row control circuitry coupled to the rows of pixels, wherein the row control circuitry comprises booster circuitry that is shared between multiple rows of pixels, wherein the booster circuitry comprises an amplifier and a plurality of switches that are configured to produce an output voltage from a power supply voltage, and wherein the switches are configured to be placed in a first mode during pre-charge operations to output a first voltage with the booster circuitry, to be placed in a second mode during pre-charge operations to output a second voltage that is different from the first voltage, to be placed in a third mode during pre-charge operations to output a third voltage that is different from the first and second voltages, and to be placed in a fourth mode during pre-charge operations to output a fourth voltage that is different from the first, second, and third voltages.

2. The image sensor defined in claim 1 wherein the power supply voltage is 2.8V.

3. The image sensor defined in claim 2 wherein the first voltage is between −1.0V and 0V.

4. The image sensor defined in claim 3 wherein the second voltage is 0V to 2.0V.

5. The image sensor defined in claim 4 wherein the third voltage is greater than 2.0V.

6. The image sensor defined in claim 5 wherein the fourth voltage is greater than 2.8V.

7. The image sensor defined in claim 1 wherein the power supply voltage is a positive voltage and the first voltage is a negative voltage.

8. The image sensor defined in claim 7 wherein the fourth voltage is greater than the power supply voltage.

9. The image sensor defined in claim 1 wherein each row of pixels has a switch coupled to the booster circuitry, and wherein the output voltage is configured to be fed to a respective row of pixels by turning on the switch coupled to the booster circuitry.

10. An image sensor comprising:
an array of imaging pixels having rows and columns of pixels; and
row control circuitry coupled to the rows of pixels, wherein the row control circuitry comprises booster circuitry that is configured to produce output voltages from a power supply voltage, at least a first one of the output voltages is greater than the power supply voltage, and at least a second one of the output voltages is less than the power supply voltage.

11. The image sensor defined in claim 10 wherein the power supply voltage is positive.

12. The image sensor defined in claim 11 wherein the second one of the output voltages produced by the booster circuitry is negative.

13. The image sensor defined in claim 12 wherein the power supply voltage is 2.8V and wherein the second one of the output voltages is −1.0V and 0V.

14. The image sensor defined in claim 10 wherein the power supply voltage is 2.8V and the first one of the output voltages is greater than 2.8V.

15. The image sensor defined in claim 14 wherein the second one of the output voltages is between −1.0V and 2.0V.

16. An image sensor comprising:
an array of imaging pixels having rows and columns of pixels; and
row control circuitry coupled to the rows of pixels, wherein the row control circuitry comprises booster circuitry that is configured to produce a plurality of output voltages from a positive power supply voltage, wherein a first output voltage of the plurality of output voltages is negative, and wherein a second output voltage of the plurality of output voltages is greater than the positive power supply voltage.

17. The image sensor defined in claim 16 wherein the first output voltage is between −1.0V and 0V and wherein the second output voltage is greater than 2.8V.

18. The image sensor defined in claim 17 wherein the positive power supply voltage is 2.8V, a third output voltage of the plurality of output voltages is between 0V and 2.0V, and a fourth output voltage of the plurality of output voltages is greater than 2.0V.

19. The image sensor defined in claim 16 wherein each row of pixels has a switch coupled to the booster circuitry, and wherein the plurality of output voltages are configured to be fed to a respective row of pixels by turning on the switch coupled to the booster circuitry.

20. The image sensor defined in claim 19 wherein the booster circuitry is shared between multiple rows of pixels and wherein the booster circuitry comprises an amplifier and a plurality of switches that are configured to produce the plurality of output voltages.

* * * * *